(12) United States Patent
Martin et al.

(10) Patent No.: US 11,448,312 B2
(45) Date of Patent: Sep. 20, 2022

(54) VALVE DEVICE FOR A VEHICLE, AUTOMATIC TRANSMISSION AND METHOD FOR CONTROLLING A VALVE DEVICE

(71) Applicant: Bayerische Motoren Werke Aktiengesellschaft, Munich (DE)

(72) Inventors: Alexander Martin, Munich (DE); Benjamin Kluge, Munich (DE); Sebastian Liebert, Unterfoehring (DE); Ulrich Ohnemus, Hattenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/677,388

(22) Filed: Aug. 15, 2017

(65) Prior Publication Data

US 2017/0343104 A1 Nov. 30, 2017

Related U.S. Application Data

(63) Continuation of application No. PCT/EP2016/051092, filed on Jan. 20, 2016.

(30) Foreign Application Priority Data

Feb. 20, 2015 (DE) .................. 10 2015 203 079.2

(51) Int. Cl.
 *F16H 61/02* (2006.01)
 *F16K 11/22* (2006.01)
 *F16K 31/122* (2006.01)
(52) U.S. Cl.
 CPC ..... *F16H 61/0251* (2013.01); *F16H 61/0276* (2013.01); *F16K 11/22* (2013.01); *F16K 31/1225* (2013.01); *F16H 2061/0279* (2013.01)

(58) Field of Classification Search
 CPC .. F16K 15/186; F16K 15/183; F16K 31/1221; F16K 31/1225; F16K 11/22; F16H 61/0276; F16H 61/0251; Y10T 137/7877
 See application file for complete search history.

(56) References Cited

U.S. PATENT DOCUMENTS

| 4,865,398 A | * | 9/1989 | Takeuchi | ................. B60T 8/42 303/115.1 |
| 5,924,539 A | | 7/1999 | Braun et al. | |

(Continued)

FOREIGN PATENT DOCUMENTS

| CN | 103363103 A | 10/2013 |
| CN | 103403400 A | 11/2013 |

(Continued)

OTHER PUBLICATIONS

International Search Report (PCT/ISA/210) issued in PCT Application No. PCT/EP2016/051092 dated May 4, 2016 with English translation (Six (6) pages).

(Continued)

*Primary Examiner* — Reinaldo Sanchez-Medina
*Assistant Examiner* — Nicole Gardner
(74) *Attorney, Agent, or Firm* — Crowell & Moring LLP

(57) ABSTRACT

A valve device for an automatic transmission for a vehicle, preferably for a motor or utility vehicle, is provided. According to the invention, the valve device is designed such that the valve device can achieve the establishment and separation of a fluid connection between an operating pressure side and an actuator pressure side, each in a state operated without pressure. Further, an automatic transmission having such a valve device and a corresponding method for controlling such a valve device are provided.

12 Claims, 11 Drawing Sheets

(56) References Cited

U.S. PATENT DOCUMENTS

| | | |
|---|---|---|
| 2005/0205138 A1 | 9/2005 | Sowul et al. |
| 2006/0091340 A1 | 5/2006 | Stevenson |
| 2013/0012354 A1 | 1/2013 | Shimizu et al. |
| 2013/0319555 A1 | 12/2013 | Ishikawa et al. |
| 2013/0319813 A1 | 12/2013 | Otanez et al. |
| 2013/0341152 A1 | 12/2013 | Otanez et al. |
| 2016/0153551 A1 | 6/2016 | Schiele et al. |
| 2017/0268659 A1* | 9/2017 | Herrmann ........... F16D 48/0206 |

FOREIGN PATENT DOCUMENTS

| | | |
|---|---|---|
| CN | 103547841 A | 1/2014 |
| DE | 1 945 951 A1 | 3/1971 |
| DE | 24 45 699 A1 | 4/1976 |
| DE | 197 21 036 A1 | 11/1997 |
| DE | 10 2005 011 915 A1 | 10/2005 |
| DE | 10 2005 051 606 A1 | 5/2006 |
| DE | 10 2006 014 759 A1 | 10/2007 |
| DE | 10 2013 209 569 A1 | 12/2013 |
| DE | 10 2013 211 674 A1 | 1/2014 |
| DE | 10 2013 212 947 A1 | 1/2015 |
| EP | 1 653 132 A1 | 5/2006 |

OTHER PUBLICATIONS

German-language Written Opinion (PCT/ISA/237) issued in PCT Application No. PCT/EP2016/051092 dated May 4, 2016 (Six (6) pages).

German-language Search Report issued in counterpart German Application No. 10 2015 203 079.2 dated Nov. 13, 2015 with partial English translation (Fifteen (15) pages).

Chinese-language Office Action issued in counterpart Chinese Application No. 201680003551.0 dated May 30, 2018 with English translation (eight pages).

* cited by examiner

VALVE DEVICE FOR A VEHICLE, AUTOMATIC TRANSMISSION AND METHOD FOR CONTROLLING A VALVE DEVICE

CROSS REFERENCE TO RELATED APPLICATIONS

This application is a continuation of PCT International Application No. PCT/EP2016/051092, filed Jan. 20, 2016, which claims priority under 35 U.S.C. § 119 from German Patent Application No. 10 2015 203 079.2, filed Feb. 20, 2015, the entire disclosures of which are herein expressly incorporated by reference.

BACKGROUND AND SUMMARY OF THE INVENTION

The invention relates to a valve device for an automatic transmission or for an automated manual transmission, and to an automatic transmission having a valve device of this type.

Furthermore, the invention relates to a method for controlling a valve device of this type for an automatic transmission.

Automatic transmissions or automated manual transmissions for motor vehicles are conventionally speed-changing transmissions which make automatic shifting of gears possible. Accordingly, a gear change is not performed manually by a driver, but rather automatically by means of corresponding automatic shifting components. For example, automatic gear changes are performed by way of suitable control of, for example, hydraulically actuable actuators which are assigned to what is known as the actuator system of the automatic transmission. For example, during the automatic gear change, a corresponding clutch actuator is actuated for disconnecting the transmission from the vehicle engine. Subsequently, the calculated gear change which is either determined from the driving state of the vehicle (fully automatic) or else is based on the gear selection of the driver (semi-automatic) is forwarded by way of a transmission logic means which is stored in a transmission control unit to a shifting actuator system of the transmission, with the result that the transmission automatically carries out the corresponding gear change.

In the case of gear changes being carried out by means of a hydraulic actuator system, in which, for example, a speed-changing transmission is actuated for gear changing by means of hydraulics, hydraulic actuating elements or actuators are actuated via a fixed hydraulic valve block and the corresponding hydraulic lines which are connected to it, which actuating elements or actuators in turn actuate respective clutches for producing or canceling a frictionally locking connection between the corresponding transmission components. It can be provided here, for example, to produce a frictionally locking connection between transmission components while maintaining a fluid pressure which prevails at a corresponding actuator, with the result that a defined transmission ratio can be realized. Here, different transmission ratios can be achieved by way of corresponding actuation of a plurality of hydraulic actuators of this type by means of the fixed hydraulic valve block.

In order to operate or to supply the hydraulic actuators with pressure, an oil pump is typically used. The oil pump is connected to the fixed hydraulic valve block and actuates the hydraulic actuating elements or actuators via hydraulic lines which are connected to the hydraulic valve block.

Here, the oil pump is connected via corresponding hydraulic lines to the hydraulic actuators which frequently rotate at different rotational speeds. Corresponding valve devices are provided in the corresponding hydraulic lines, via which valve devices a pressure supply to the hydraulic actuators can be performed or switched off. On account of the relative rotation between the respective valve devices and the hydraulic lines, which rotate and/or are fixed at least in sections, to the hydraulic actuators, the valve devices are frequently realized in a rotary shaft of the automatic transmission and are connected to the hydraulic actuators via what are known as rotary leadthroughs.

Leakage losses occur, however, at the interface of the rotary leadthroughs on account of the relative rotation. This is all the more so if the oil pump has to be operated continuously for the pressure supply of the hydraulic actuators, that is to say not only during individual shifting operations, but rather also in order to keep gears which have already been engaged in their shifting state.

The invention is therefore based on the object of developing the valve devices of the generic type, automatic transmissions and methods for controlling valve devices of this type in such a way that possible leakage losses can be reduced and/or a more efficient method of operation is made possible.

This and other objects are achieved in accordance with embodiments of the invention.

The valve device according to the invention is provided for an automatic transmission for a vehicle, preferably for a motor vehicle or commercial vehicle. The valve device includes a valve housing element with a first valve chamber, via which a fluid connection can be established between a working pressure side and an actuator pressure side, and a second valve chamber which can be connected to a control pressure side for loading with a control pressure. The valve device also includes a valve slide element which is guided movably by way of the valve housing element and is loaded by means of a first prestressing element with a first prestressing force which is directed in an opening direction. The valve slide element has an actuating section which is arranged in the first valve chamber and a fluid pressure loading section which is arranged in the second valve chamber. In the case of loading with a control pressure, a force acts on the pressure loading section, which is directed in a closure direction which is opposed to the opening direction. The valve device also includes a valve closure element which is guided movably by way of the valve housing element in the first valve chamber in such a way that the valve closure element permits the fluid connection between the working pressure side and the actuator pressure side in a first position and disconnects the fluid connection in a second position. The valve closure element is loaded by means of a second prestressing element with a second prestressing force which is smaller than the first prestressing force and is directed in the closure direction. As a result, the valve closure element is held in the first position by means of the actuating section. The valve slide element and the valve closure element are configured to interact in such a way that, in the case of a prevailing actuator pressure-side fluid pressure by way of an increase in the control fluid pressure in the second valve chamber, the actuating section moves away from the valve closure element in the closure direction. As a result, the valve closure element can assume the second position and, by way of a subsequent reduction of a working pressure-side fluid pressure and subsequently of the control pressure in the second valve chamber, the valve closure element is held in the second position by way of the second prestressing force and a force on the closure element. Such a force is caused by way of the actuator pressure-side fluid pressure which prevails in the first valve chamber, counter to the first prestressing force which is applied to the closure element by way of the actuating section.

In this way, a pressure locking mechanism is provided using the valve device according to the invention. The pressure locking mechanism can be arranged, in the case of the hydraulic automatic transmission, in a rotary leadthrough which leads directly to the hydraulic actuator or, in the case of a hydraulic actuator which is coupled to the housing, can be positioned in the automatic transmission in any desired way.

Here, the holding of the first position of the valve closure element for producing the fluid connection is realized in such a way that no active operation of the oil pump is necessary to this end. As a result, the actuator pressure can be adapted without problems (in both directions) via the working pressure. Here, the locking action is triggered actively by way of the control pressure. If, in the case of an activated control pressure, the working pressure is lowered, the current actuator pressure is as it were "locked in" and the hydraulic actuator remains "pressurized" or pressure loading remains maintained. As a result, the hydraulic actuator remains closed for maintaining a frictionally locking connection between respective automatic transmission components for fixing a defined transmission ratio. As soon as the closure element is locked, that is to say assumes its second position, the working pressure and subsequently also the control pressure and therefore the entire system pressure can be lowered. After the lowering of the working pressure, the control pressure is therefore no longer required in order to ensure that the clutch pressure remains maintained.

By way of the valve device according to the invention, leakage losses and drag losses can therefore be reduced at rotary leadthroughs in the case of fixedly engaged shifting states of the automatic transmission. In addition, a targeted pressure reduction is made possible as a result and also, the general reduction of drag losses. Therefore, the degree of efficiency of an automatic transmission can be improved overall. The valve device according to the invention makes it possible, furthermore, to perform shifting operations without reaction times being extended. By way of the embodiment of the locking action, no pressure jump which would possibly be discernible to the driver occurs at the hydraulic actuators during opening.

The valve device according to the invention can advantageously be developed in such a way that the valve slide element and the valve closure element are configured to interact in such a way that the valve closure element which is held in the second position can be transferred into the first position by the valve closure element being loaded by way of a force in the opening direction. Such a force is caused by way of a working pressure-side fluid pressure which prevails in the first valve chamber. As a result, the valve closure element is pushed in the opening direction into its first position counter to the second prestressing force by way of the first prestressing force and the force which is caused by way of the working pressure-side fluid pressure. If the working pressure is raised above the clutch pressure, the locking action is unlocked and the two pressures are equalized and can subsequently be raised or lowered accordingly. As a result, in particular during opening of a hydraulic actuator, a pressure jump which would be discernible to the driver does not occur at the clutch.

Furthermore, the valve device according to the invention can be implemented in such a way that the valve housing element has a third valve chamber which can be connected to a further control pressure side for loading with a further control pressure. The valve slide element has a further fluid pressure loading section which is arranged in the third valve chamber and on which, in the case of loading with a further control pressure, a force which is directed in the opening direction acts. The valve slide element and the valve closure element are configured to interact in such a way that the closure element can be transferred into the first position by way of loading of the third valve chamber with the further control pressure, independently of the working pressure-side and/or actuator pressure-side fluid pressure which prevails in the first valve chamber and/or of the control fluid pressure which prevails in the second valve chamber. That is to say, if the further control pressure which prevails in the third valve chamber exceeds the control pressure which prevails in the second valve chamber, the valve slide element can be moved in the opening direction. However, no control pressure or only a correspondingly low control pressure preferably prevails in the second valve chamber if pressure loading of the third valve chamber with the further control pressure takes place. A further type of unlocking action is possible via the further control pressure. In this way, it becomes possible to open the pressure locking mechanism in an active manner and hold it open. In this way, the hydraulic actuators can be operated conventionally if required, in particular during dynamic driving. In the case of a fault, all locking actions open centrally via the brief actuation with the further control pressure and in this way, reliably achieve a state which is free from a non-positive connection and/or frictionally locking connection. In addition, the further control pressure can be coupled to the system pressure via a passive switching valve, for example in the form of a threshold valve such as a check valve. As a result, the locking action is held open in a targeted manner in the case of high system pressures, and shifting operations, in particular sport shifting operations which are performed typically with high engine torques and therefore with high clutch pressures, can be carried out without restrictions, in particular with a minimum reaction time. A reliable pressureless state can always be achieved by way of the central unlocking possibility via the further control pressure, even in the case of a fault. In addition, no shifting and reaction time restrictions occur, in particular during sporty driving.

The automatic transmission according to the invention is provided for a vehicle, preferably for a motor vehicle or commercial vehicle, and includes the valve device according to the invention.

The method according to the invention is provided for controlling the valve device according to the invention and has the following steps:

loading the actuator pressure side with an actuator pressure-side fluid pressure by means of a controllable working pressure-side working pressure or fluid pressure, subsequently increasing a control fluid pressure in the second valve chamber, with the result that the actuating section moves away from the valve closure element in the closure direction and the valve closure element can assume the second position, and subsequently reducing the working pressure and the control pressure in the second valve chamber, with the result that the valve closure element is held in the second position by way of the second prestressing force and a force on the closure element, which force is caused by way of the actuator pressure-side fluid pressure which prevails in the first valve chamber, counter to the first prestressing force which is applied to the closure element by way of the actuating section. This results in an identical or similar way in the properties and advantages described in conjunction with the valve device according to the invention, for which reason reference is made to the corresponding statements in conjunction with the valve device according to the invention, in order to avoid repetitions. The same applies analogously to the following preferred embodiments of the method according to the invention, reference also being made in this regard to the corresponding statements in conjunction with the valve device according to the invention.

The method according to the invention can advantageously be developed in such a way that the method has, furthermore, the following steps:

transferring the valve closure element which is held in the second position into the first position, by the valve closure element being loaded in the opening direction with a force which is caused by way of a working pressure-side fluid pressure which prevails in the first valve chamber. As a result, the valve closure element is pushed in the opening direction into its first position by way of the first prestressing force and the force counter to the second prestressing force, which force is caused by way of the working pressure-side fluid pressure.

Furthermore, the method according to the invention can be implemented in such a way that the method has, furthermore, the following steps:

transferring the closure element into the first position by way of loading of the third valve chamber with the further control pressure, independently of the working pressure-side and/or actuator pressure-side fluid pressure which prevails in the first valve chamber and/or of the control fluid pressure which prevails in the second valve chamber.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
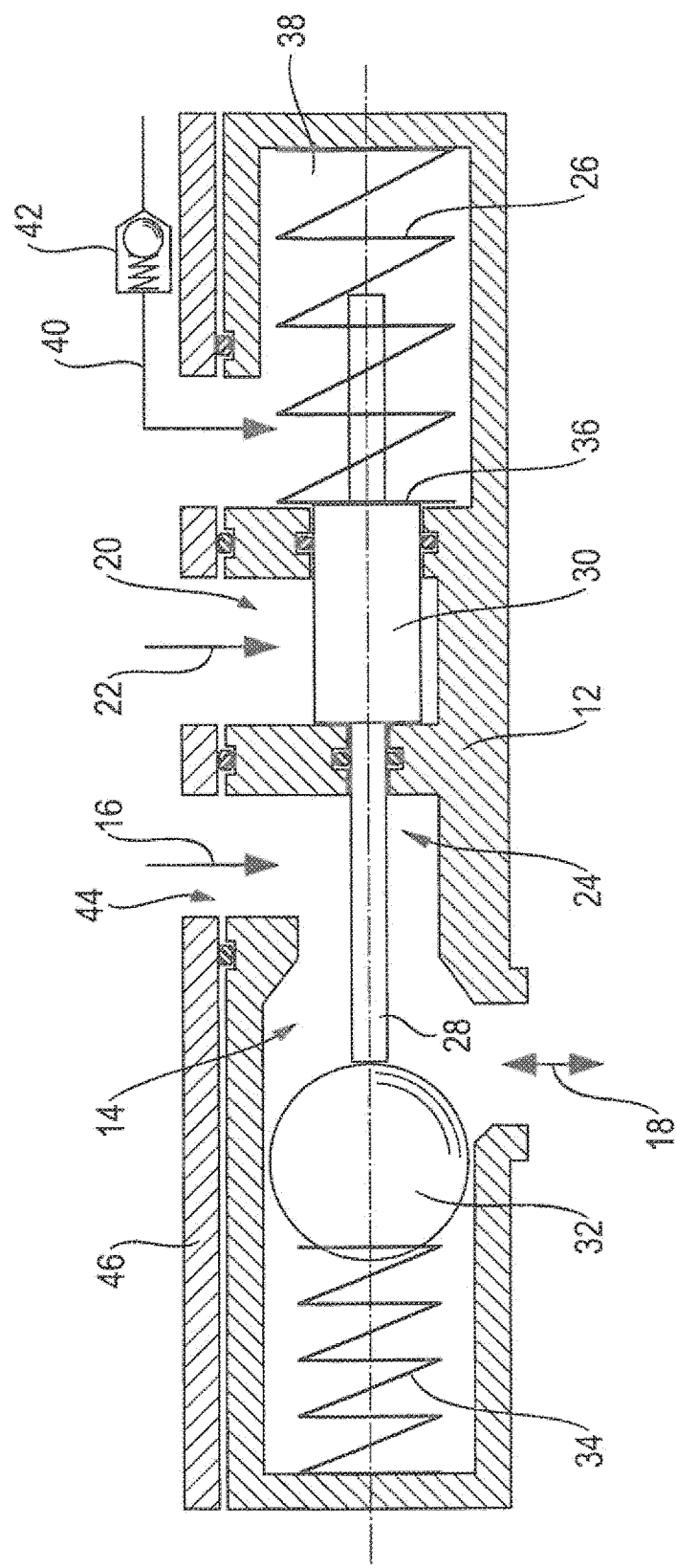
FIGS. 1-11 show a valve device according to the invention for an automatic transmission for a motor vehicle, in different states.

First of all, the construction of a valve device 10 according to the invention for an automatic transmission for a motor vehicle will be described in greater detail.

In an exemplary embodiment, the valve device 10 according to the invention is assigned to a hydraulic actuator system of an automatic transmission (not shown in greater detail), in which a speed-changing transmission is actuated by means of hydraulics for gear changing. In the automatic transmission, hydraulic actuators are actuated via a fixed hydraulic valve block and corresponding hydraulic lines, which hydraulic actuators in turn actuate respective clutches for producing or canceling a frictionally locking connection between corresponding speed-changing transmission components of the automatic transmission. It is provided here to produce a frictionally locking connection between transmission components of the automatic transmission while maintaining a fluid pressure (fluid pressure on actuator pressure side 18) which prevails at a corresponding actuator, with the result that a defined transmission ratio is realized. Here, different transmission ratios can be achieved by way of corresponding actuating of a plurality of hydraulic actuators of this type by means of the fixed hydraulic valve block. For operating or for supplying the hydraulic actuators with pressure, an oil pump (not shown in the figures) is typically used, which oil pump is connected to the fixed hydraulic valve block and via which a fluid pressure can therefore be set in a working pressure side 16. This is connected via corresponding hydraulic lines to the hydraulic actuators which frequently rotate at different rotational speeds. The valve device 10 according to the invention is provided in a respective hydraulic line, via which valve device 10 a pressure supply to at least one hydraulic actuator can be performed or can be switched off. On account of the relative rotation between the respective valve device 10 and the hydraulic line to the hydraulic actuator, which hydraulic line rotates or is fixed at least in sections and is configured by way of a transmission component 46, the valve device 10 is realized in this case in a rotary shaft of the automatic transmission and is connected to the hydraulic line via what is known as a rotary leadthrough 44.

As can be seen from FIGS. 1-11, the valve device 10 according to the invention has a valve housing element 12, a valve slide element 24 and a valve closure element 32.

The valve housing element 12 includes a first valve chamber 14, via which a fluid connection can be established between the working pressure side 16 and the actuator pressure side 18. Furthermore, the valve housing element 12 includes a second valve chamber 20 which can be connected to a control pressure side 22 for loading with a control pressure. Furthermore, the valve housing element 12 has a third valve chamber 38 which can be connected to a further control pressure side 40 for loading with a further control pressure. Here, the further control pressure side 40 is connected via a threshold valve, for example in the form of a check valve 42, to a system pressure side (not shown in greater detail), a controllable system pressure $P_{SYS}$ which can be set to be lower than or higher than 15 bars prevailing on the system pressure side. In this exemplary embodiment, the check valve 42 opens at a system pressure $P_{SYS}$ of greater than 15 bars. Otherwise, the check valve 42 is closed.

The valve slide element 24 is guided movably by way of the valve housing element 12 and is loaded by means of a first prestressing element 26 in the form of a spring, for example a helical spring, with a first prestressing force which is directed in an opening direction (a direction which points to the left in FIG. 1). Furthermore, the valve slide element 24 has an actuating section 28 which is arranged in the first valve chamber 14 and a fluid pressure loading section 30 which is arranged in the second valve chamber 20 and on which, in the case of loading with a control pressure, a force acts which is directed in a closure direction which is opposed to the opening direction. Furthermore, the valve slide element 24 has a further fluid pressure loading section 36 which is arranged in the third valve chamber 38 and on which, in the case of loading with a further control pressure, a force acts which is directed in the opening direction.

Moreover, the valve closure element 32 is guided movably by way of the valve housing element 12 in the first valve chamber 14 in such a way that the valve closure element 32 permits the fluid connection between the working pressure side 16 and the actuator pressure side 18 in the first position and disconnects the fluid connection in a second position. Furthermore, the valve closure element 32 is loaded by means of a second prestressing element 34 in the form of a spring, for example a helical spring, with a second prestressing force which is smaller than the first prestressing force and is directed in the closure direction, with the result that the valve closure element 32 is held in the first position by means of the actuating section 28. Here, the first position of the valve closure element 32 is predefined by way of a stop (not described in greater detail) of the valve slide element 24 on the valve housing element 12 and by way of the second prestressing element 34. In contrast, the second position of the valve closure element 32 is predefined by way of a valve seat for the valve closure element 32, which valve seat is configured in the valve housing element 12, and by way of the second prestressing element 34.

The valve device 10 according to the invention with the above-mentioned construction is set up such that the valve slide element 24 and the valve closure element 32 interact in such a way that, in the case of a prevailing actuator pressure-side fluid pressure by way of an increase in a control fluid pressure in the second valve chamber 20, the actuating section 28 moves away from the valve closure element 32 in the closure direction. As a result, the valve closure element 32 can assume the second position, and by way of subsequent reduction of the working pressure and in turn subsequent reduction of the control pressure in the second valve chamber 20, the valve closure element 32 is held in the second position by way of the second prestressing force and a force on the closure element 32, which force is caused by way of the actuator pressure-side fluid pressure which prevails in the first valve chamber 14, counter to the first prestressing force which is applied to the closure element 32 by way of the actuating section 28.

Furthermore, the valve device 10 according to the invention with the above-mentioned construction is set up such that the valve slide element 24 and the valve closure element 32 interact in such a way that the valve closure element 32 which is held in the second position can be transferred into the first position, by the valve closure element 32 being loaded in the opening direction with a force which is caused by way of a working pressure-side fluid pressure which prevails in the first valve chamber 14. As a result, the valve closure element 32 is pushed in the opening direction into its first position by way of the first prestressing force and the force which is caused by way of the working pressure-side fluid pressure counter to the second prestressing force.

Moreover, the valve device 10 according to the invention with the above-mentioned construction is set up such that the valve slide element 24 and the valve closure element 32 interact in such a way that the closure element 32 can be transferred into the first position by way of loading of the third valve chamber 38 with the further control pressure, independently of the working pressure-side fluid pressure which prevails in the first valve chamber 14 and of the control fluid pressure which prevails in the second valve chamber 20. There is preferably no control pressure or virtually no control pressure in the second valve chamber 20 if the valve slide element 24 is to be moved in the opening direction by means of the further control pressure in the third valve chamber 38. In order to move the valve slide element 24 in the opening direction, it is merely necessary, however, that the further control pressure in the third valve chamber 38 exceeds the control pressure in the second valve chamber and therefore a force acts overall in the opening direction on the valve slide element 24, which force exceeds forces which are directed in the closing direction and act on the valve slide element 24.

The method of operation of the valve device 10 according to the invention is described next.

FIG. 1 shows the valve device 10 according to the invention in a state, in which no pressure loading takes place in the first, second and third valve chambers 14, 20 and 38. That is to say, a reference working pressure $P_{AD}$ on the working pressure side 16 is zero; a reference actuator pressure $P_{KD}$ on the actuator pressure side 18 is zero; a reference control pressure $P_{ST}$ on the control pressure side 22 is zero; and a further reference control pressure $P_{ST2}$ on the further control pressure side 40 is zero. Here, the further control pressure side 40 is connected via the check valve 42 to the system pressure side, a pressure $P_{SYS}$ of less than 15 bars prevailing in this case on the system pressure side, with the result that the check valve 42 remains closed.

Accordingly, during the "pressureless" operation of the valve device 10 according to the invention, the valve closure element 32 is situated in its first position, that is to say the valve closure element 32 permits the fluid connection between the working pressure side 16 and the actuator pressure side 18.

Figure 2:
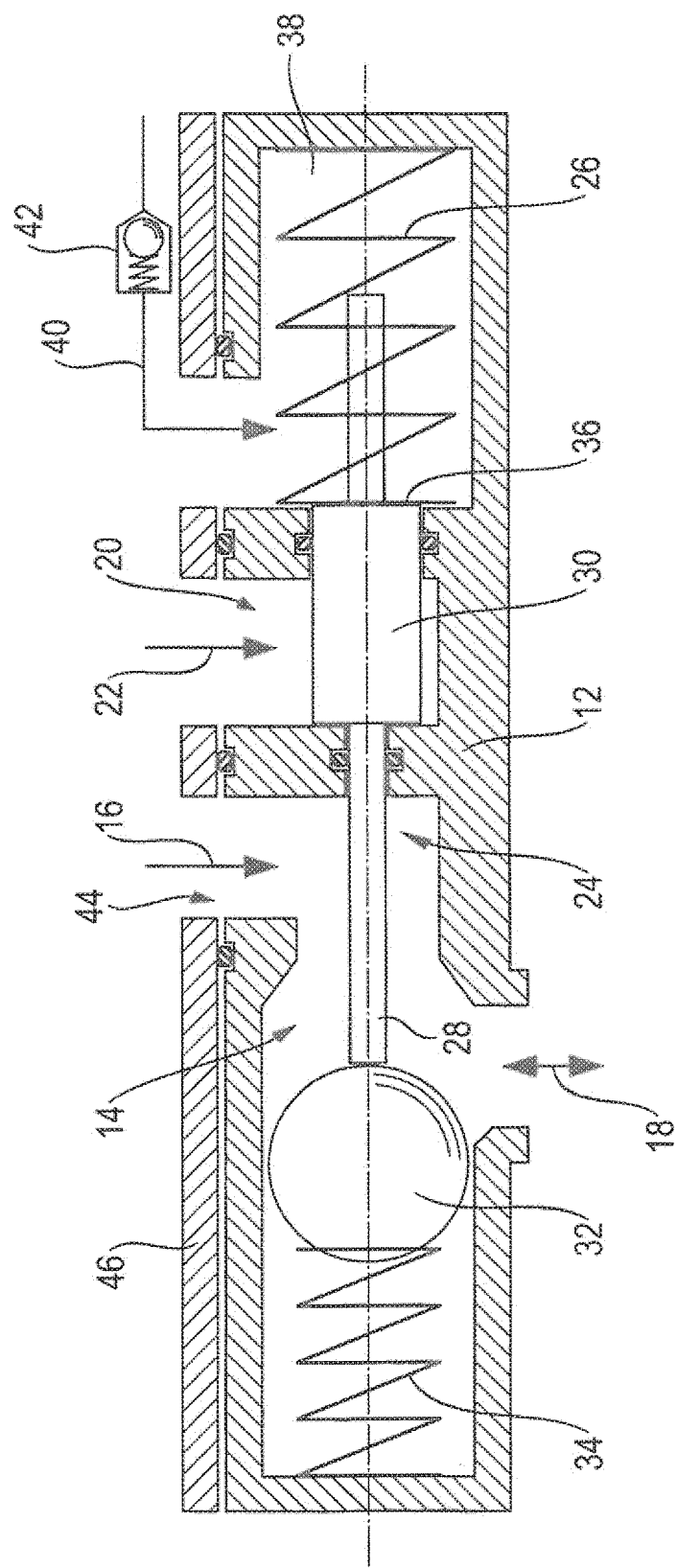

FIG. 2 shows the valve device 10 according to the invention in a further state which follows the state which is described in conjunction with FIG. 1 and in which pressure loading takes place in the first valve chamber 14, that is to say a working pressure $P_{AD}$ on the working pressure side 16 is increased. Accordingly, the actuator pressure $P_{KD}$ on the actuator pressure side 18 is also increased. The reference control pressure $P_{ST}$ on the control pressure side 22 remains at zero, and the further reference control pressure $P_{ST2}$ on the further control pressure side 40 likewise remains at zero.

Accordingly, during the operation of the valve device 10 according to the invention, the valve closure element 32 continues to be situated in its first position, and the actuator pressure $P_{KD}$ on the actuator pressure side 18 can therefore be increased by way of control of the working pressure $P_{AD}$ on the working pressure side 16.

Figure 3:
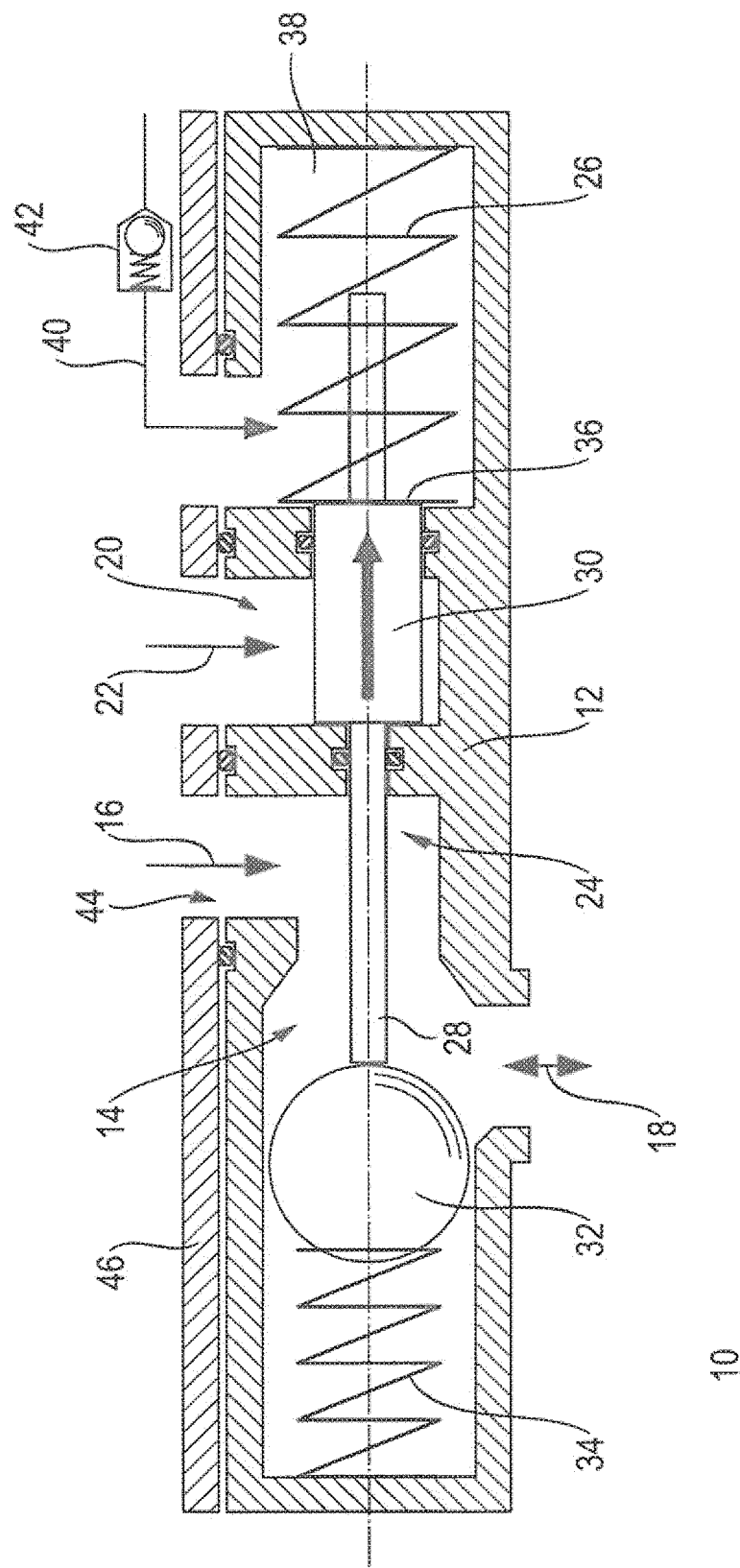

FIG. 3 shows the valve device 10 according to the invention in a further state which follows the state which is described in conjunction with FIG. 2 and in which pressure loading takes place in the first valve chamber 14, that is to say the working pressure $P_{AD}$ on the working pressure side 16 is held. As a result, the actuator pressure $P_{KD}$ on the actuator pressure side 18 is also held. The control pressure $P_{ST}$ is then increased, which leads to the valve slide element 24 being pushed gradually in the closing direction (the direction which points to the right in FIG. 3, as indicated by way of the arrow). The further reference control pressure $P_{ST2}$ on the further control pressure side 40 remains at zero.

Accordingly, during the operation of the valve device 10 according to the invention, the valve closure element 32 is pushed into its second position by way of the second prestressing element 34, with the result that a disconnection of the fluid connection between the actuator pressure side 18 and the working pressure side 16 takes place gradually.

Figure 4:
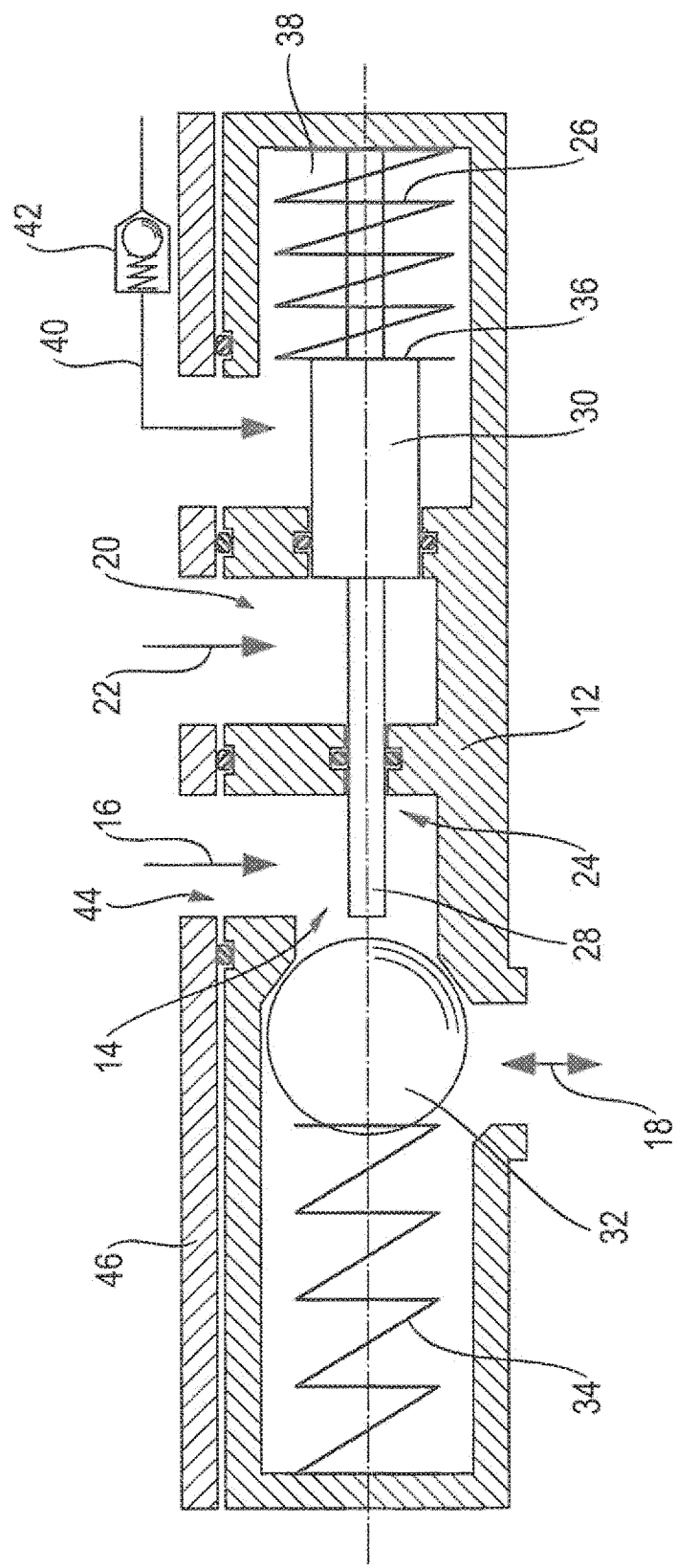

FIG. 4 shows the valve device 10 according to the invention in a further state which follows the state which is described in conjunction with FIG. 3, where pressure loading takes place in the first valve chamber 14. That is to say, the working pressure $P_{AD}$ on the working pressure side 16 is held and the actuator pressure $P_{KD}$ on the actuator pressure side 18 is held on account of the closure by way of the valve closure element 32. On account of the increased control pressure $P_{ST}$, the valve slide element 24 is moved as far as a stop in the closing direction. As a result, the valve closure element 32 is situated in its second position and disconnects the above-mentioned fluid connection. The further reference control pressure $P_{ST2}$ on the further control pressure side 40 remains at zero.

Accordingly, during the operation of the valve device 10 according to the invention, the valve closure element 32 is situated in its second position in the valve seat which is configured by way of the valve housing element. As a result, the disconnection of the fluid connection between the actuator pressure side 18 and the working pressure side 16 has been performed.

Figure 5:
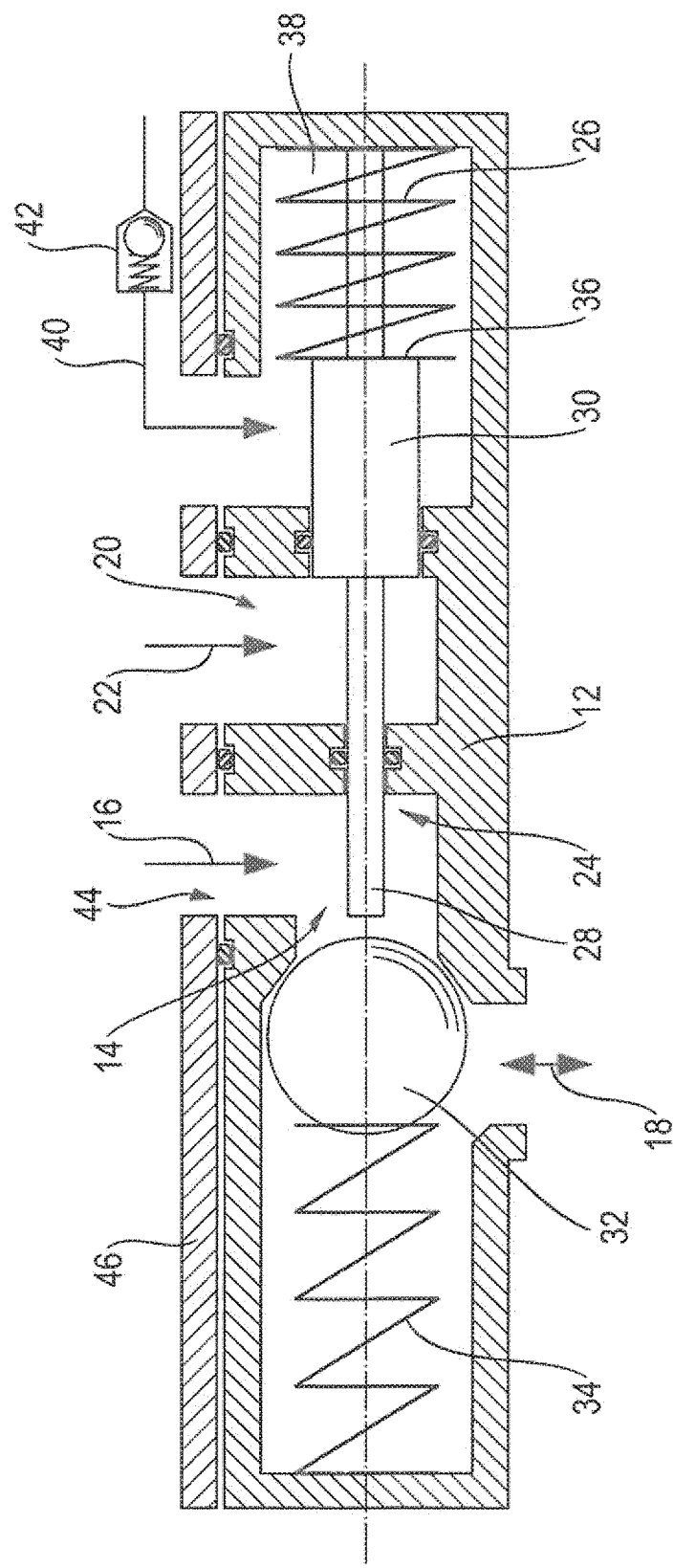

FIG. 5 shows the valve device 10 according to the invention in a further state which follows the state which is described in conjunction with FIG. 4, where no pressure loading takes place in the first valve chamber 14. That is to say, the working pressure $P_{AD}$ on the working pressure side 16 is reduced to zero, and the actuator pressure $P_{KD}$ on the actuator pressure side 18 is held on account of the closure by way of the valve closure element 32. In this case, the control pressure $P_{ST}$ is still held, and the further reference control pressure $P_{ST2}$ on the further control pressure side 40 remains at zero.

Accordingly, during the operation of the valve device 10 according to the invention, the valve closure element 32 continues to be situated in its second position.

Figure 6:
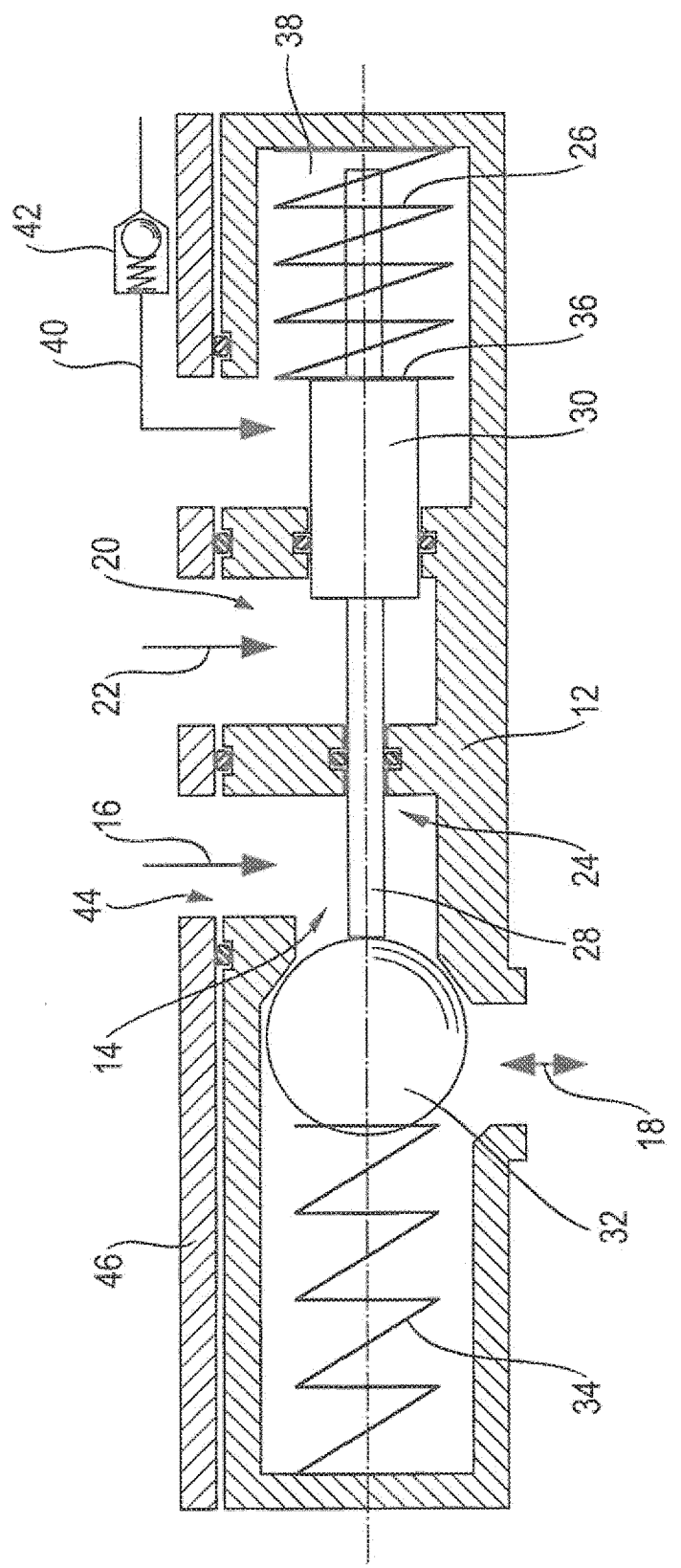

FIG. 6 shows the valve device 10 according to the invention in a further state which follows the state which is described in conjunction with FIG. 5, where no pressure loading takes place in the first valve chamber 14. That is to say, the working pressure $P_{AD}$ on the working pressure side 16 is already reduced to zero, and the actuator pressure $P_{KD}$ on the actuator pressure side 18 is continued to be held on account of the closure by way of the valve closure element 32. The control pressure $P_{ST}$ on the control pressure side 22 is then also reduced to zero, and the further reference control pressure $P_{ST2}$ on the further control pressure side 40 remains at zero.

Accordingly, during the operation of the valve device 10 according to the invention, the valve closure element 32 continues to be situated in its second position, and it is possible for the second position of the valve closure element 32 to be held during "pressureless" operation of the valve device 10 according to the invention. This can occur since the sum of the forces in the closing direction which are caused by way of the second prestressing element 34 and the actuator pressure $P_{KD}$ and act on the valve closure element 32 is greater than the prestressing force of the first prestressing element 26, which prestressing force is directed in the opening direction and acts directly on the valve slide element 24 and therefore indirectly on the valve closure element 32.

Figure 7:
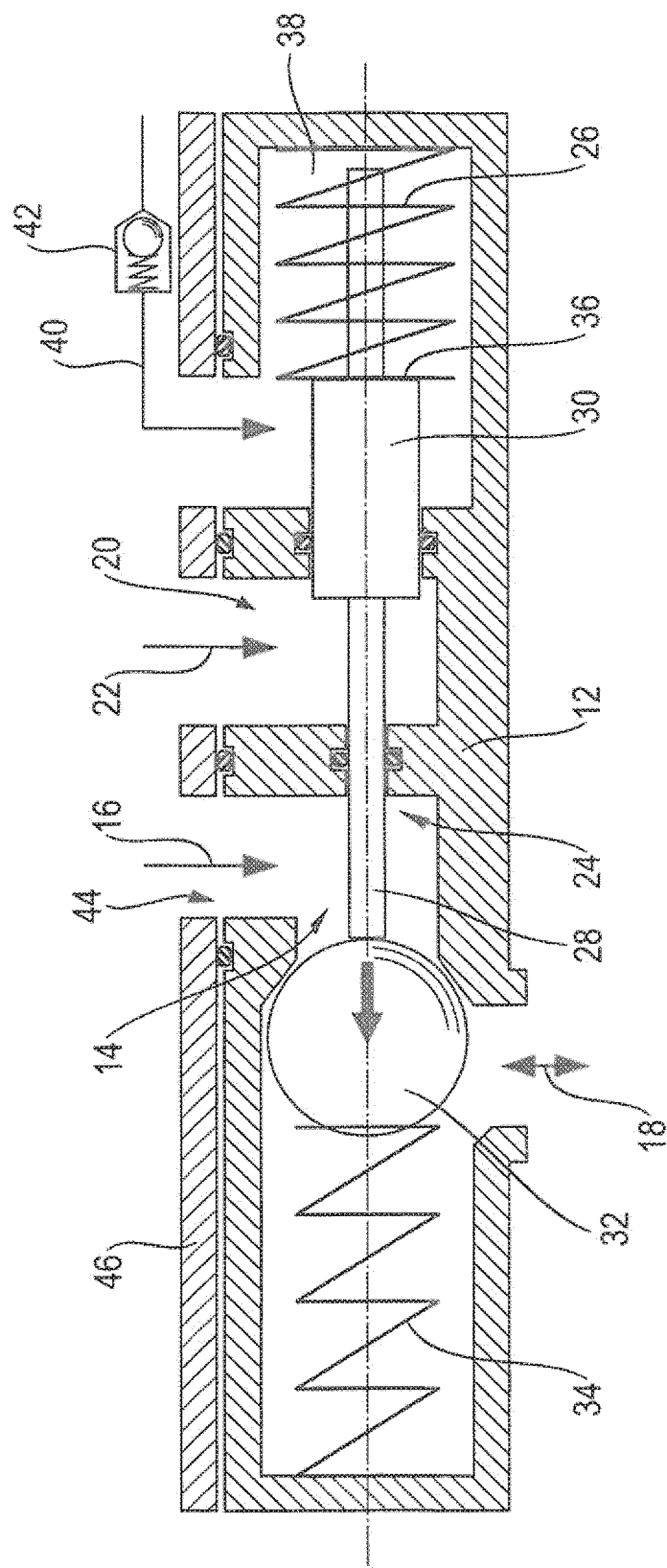

FIG. 7 shows the valve device 10 according to the invention in a further state which follows the state which is described in conjunction with FIG. 6, where pressure loading is again performed in the first valve chamber 14. That is to say, the working pressure $P_{AD}$ on the working pressure side 16 is increased, with the result that a force in the opening direction which acts on the valve closure element 32, as indicated by way of the arrow, is built up gradually. As long as the force is smaller than the resultant from the second prestressing element and the actuator pressure $P_{KD}$, the valve closure element 32 remains in its second position. In this case, the control pressure $P_{ST}$ on the control pressure side 22 is held at zero, and the further reference control pressure $P_{ST2}$ on the further control pressure side 40 remains at zero.

Figure 8:
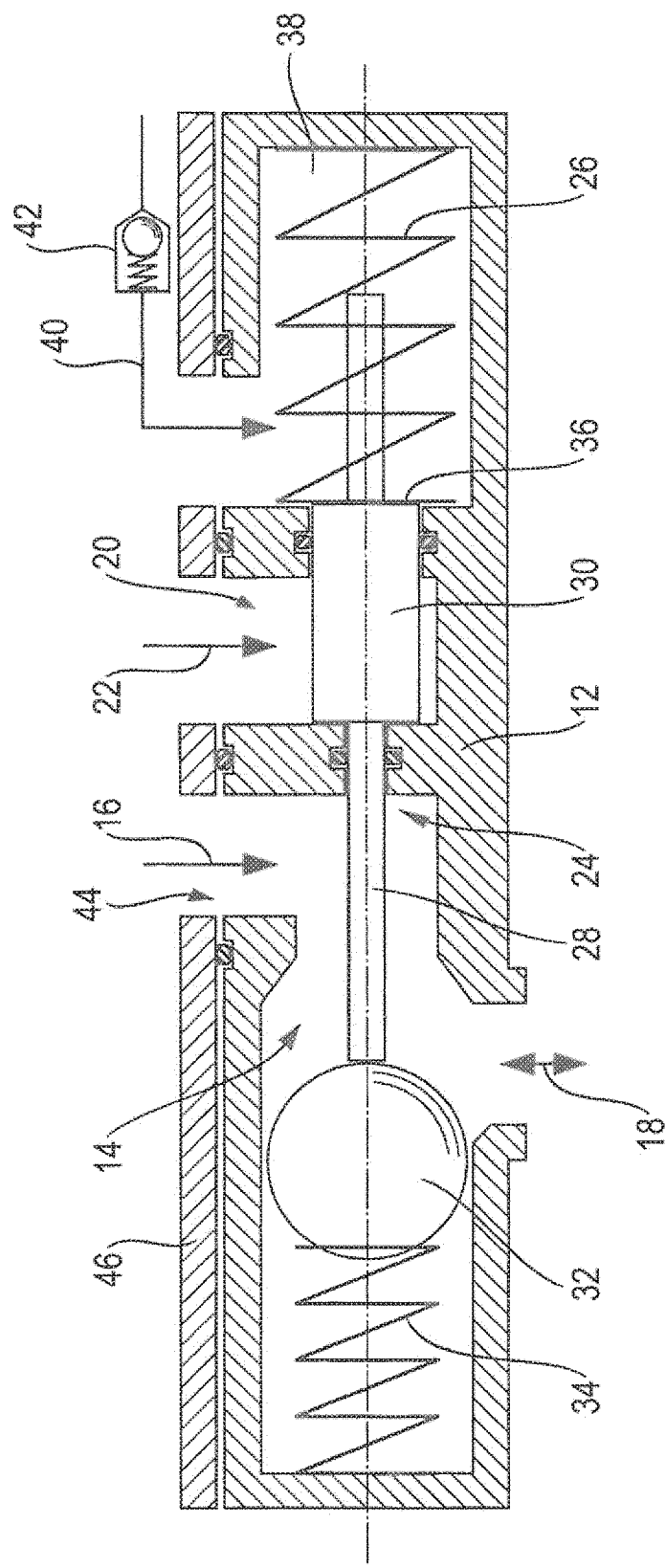

FIG. 8 shows the valve device 10 according to the invention in a further state which follows the state which is described in conjunction with FIG. 7, where pressure loading has been performed in the first valve chamber 14. That is to say, the working pressure $P_{AD}$ on the working pressure side 16 is raised briefly above the actuator pressure $P_{KD}$, with the result that the valve closure element 32 moves in the opening direction. As soon as the valve closure element 32 has established the fluid connection between the working pressure side 16 and the actuator pressure side 18, merely a force which exceeds the prestressing force of the second prestressing element 34 is still required for the further movement of the valve closure element 32 in the opening direction. In this case, the control pressure $P_{ST}$ on the control pressure side 22 continues to be held at zero, and the further reference control pressure $P_{ST2}$ on the further control pressure side 40 remains at zero.

In this way, a closing and opening operation of the valve device 10 according to the invention has been described in detail using FIGS. 1 to 8.

Figure 9:
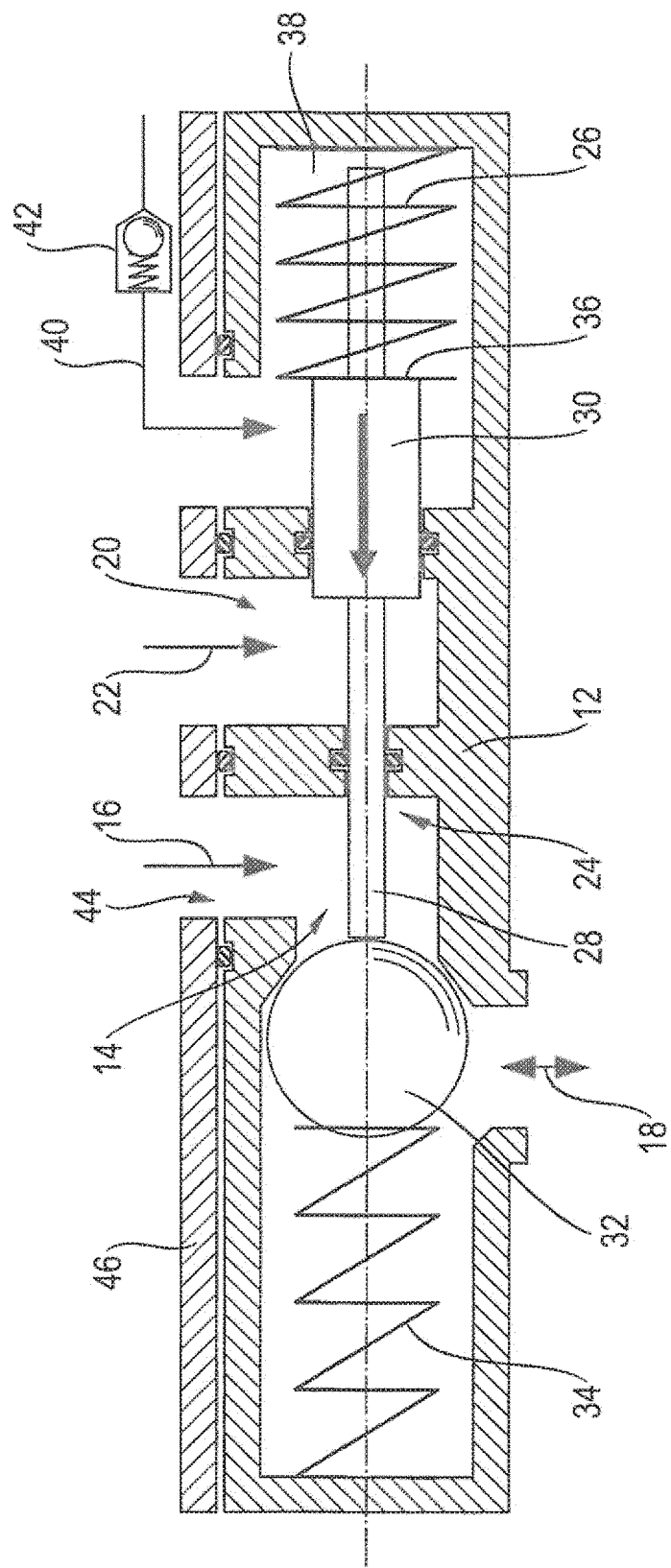
Figure 10:
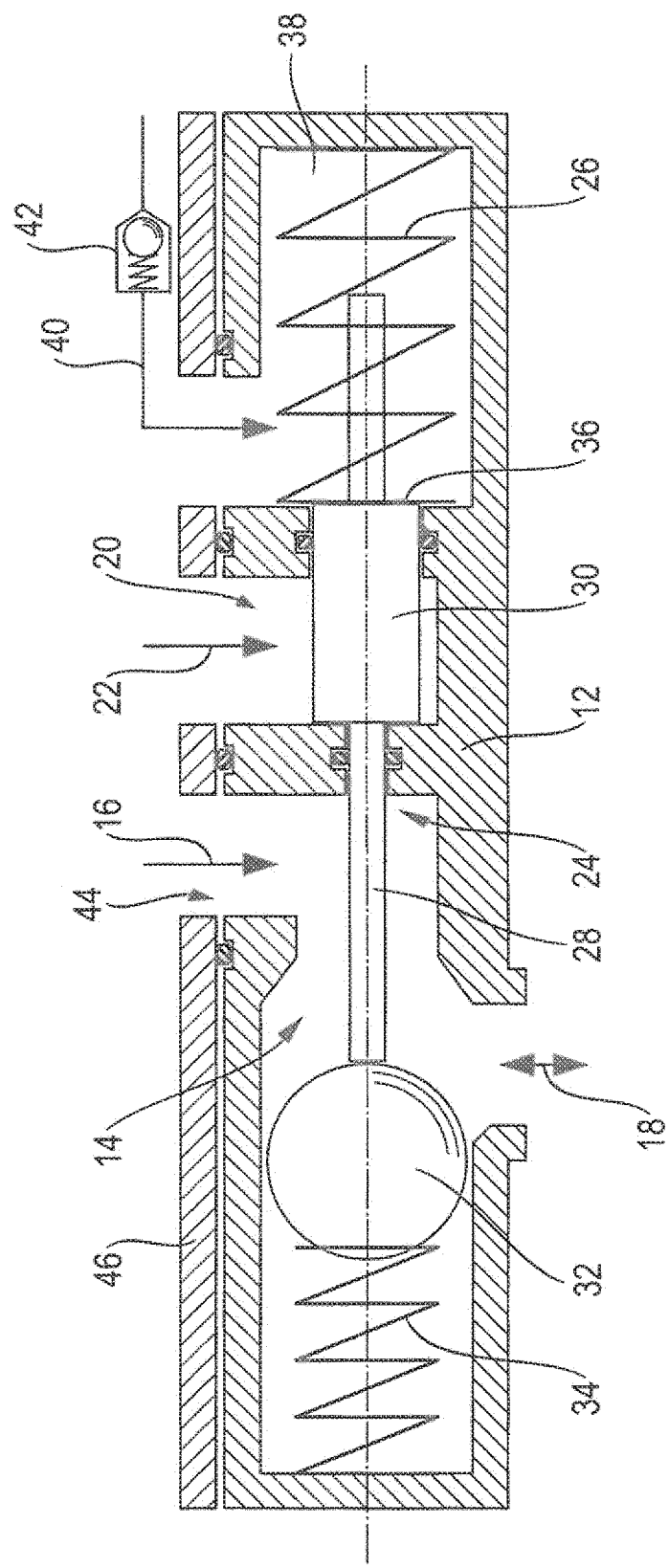
Figure 11:
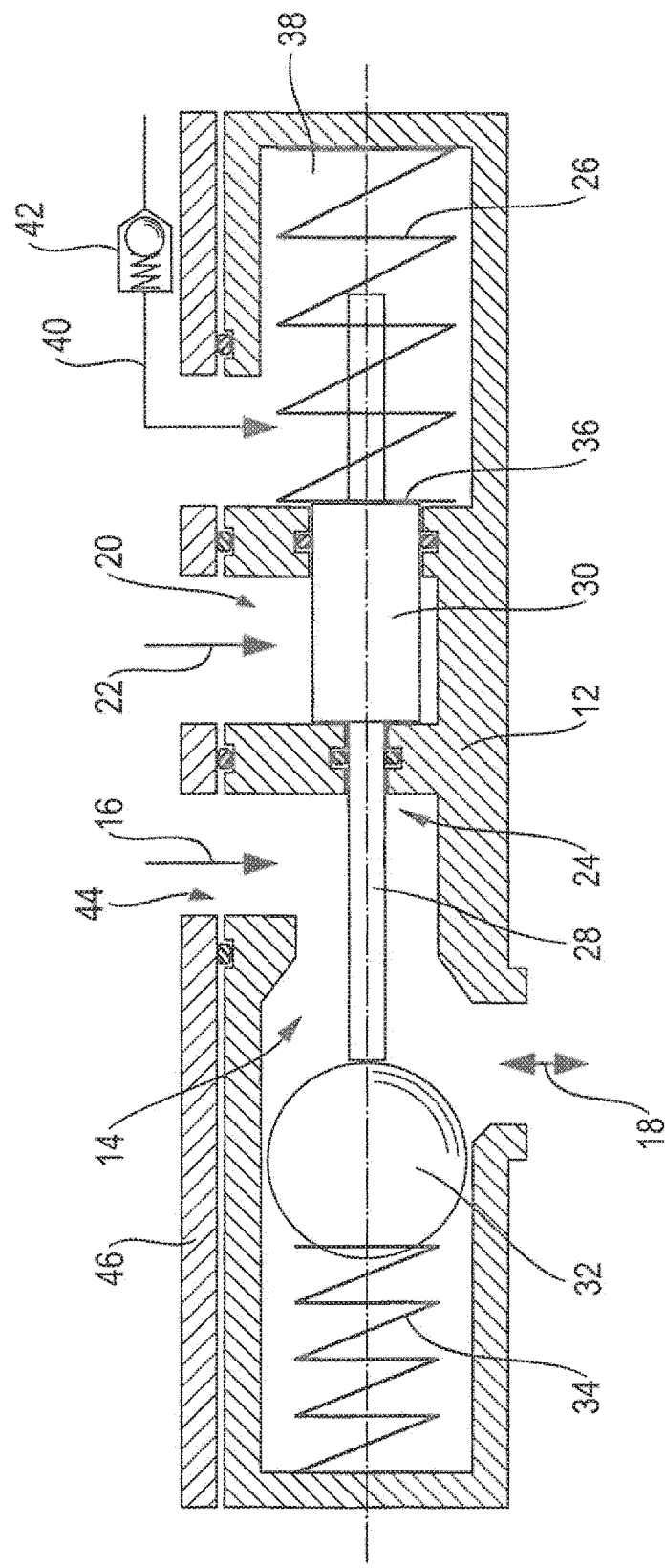

FIGS. 9 to 11 describe a further possibility of transferring the closure element 32 into the first position by way of loading of the third valve chamber 38 with the further control pressure $P_{ST2}$, independently of the working pressure-side fluid pressure $P_{AD}$ which prevails in the first valve chamber 14, the actuator pressure-side fluid pressure $P_{KD}$ which prevails in the first valve chamber 14, and of the control fluid pressure $P_{ST}$ which prevails in the second valve chamber 20. The working pressure-side fluid pressure $P_{AD}$ and the control fluid pressure $P_{ST}$ preferably lie at 0 bar. As illustrated in FIGS. 9 to 11, pressure loading of the third valve chamber 38 leads to a force in the opening direction, which force acts on the fluid pressure loading section 30, in addition to the prestressing force of the first prestressing element 26. As a result, the valve closure element 32 is moved into its first position and can be held there, even if an actuator pressure $P_{KD}$ prevails which, together with the prestressing force of the second prestressing element 34 has led to the valve closure element 32 having been held in its second position (see FIGS. 9 and 10). A further control pressure $P_{ST2}$ of 15 bars or more results on account of the fact that the check valve 42 opens only above 15 bars.

As soon as the valve closure element 32 has been transferred into its first position, the further control pressure $P_{ST2}$ can be reduced to zero again (see FIG. 11).

The features of the invention which are disclosed in the preceding description, in the drawings and in the claims can be essential for the implementation of the invention both individually and in any desired combination.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A valve device for an automatic transmission for a vehicle, the valve device comprising:
   a valve housing element with a first valve chamber, via which a fluid connection is establishable between a working pressure side and an actuator pressure side, and a second valve chamber which is connectable to a control pressure side for loading with a control pressure;
   a valve slide element which is guided movably by way of the valve housing element and is loaded by means of a first prestressing element with a first prestressing force which is directed in an opening direction, the valve slide element having an actuating section which is arranged in the first valve chamber and a fluid pressure loading section which is arranged in the second valve chamber and on which, in the case of loading with a control pressure, a force acts which is directed in a closure direction which is opposed to the opening direction;

a valve closure element which is guided movably by way of the valve housing element in the first valve chamber in such a way that the valve closure element permits the fluid connection between the working pressure side and the actuator pressure side in a first position without operation of an oil pump, and disconnects the fluid connection in a second position, the valve closure element being loaded by means of a second prestressing element with a second prestressing force which is smaller than the first prestressing force and is directed in the closure direction, such that the valve closure element is held in the first position by means of the actuating section, wherein the valve slide element and the valve closure element are configured to interact in such a way that, in the case of a prevailing actuator pressure-side fluid pressure by way of an increase in the control fluid pressure in the second valve chamber, the actuating section moves away from the valve closure element in the closure direction, with the result that the valve closure element can assume the second position, and that, by way of a subsequent reduction of a working pressure-side fluid pressure and subsequently of the control pressure in the second valve chamber, the valve closure element is held in the second position by way of the second prestressing force and a force on the closure element, which force is caused by way of the actuator pressure-side fluid pressure which prevails in the first valve chamber, counter to the first prestressing force which is applied to the closure element by way of the actuating section; and a third valve chamber which connectable to a further control pressure side for loading with a further control pressure, wherein the valve closure element is transferred into the first portion by way of loading of the third valve chamber with the further control pressure, independently of the working pressure-side and actuator pressure-side fluid pressure which prevails in the first valve-chamber and of the control fluid pressure into the first position, which control fluid pressure prevails in the second valve chamber, wherein
the further control pressure is coupled to the system pressure via a check valve, so that a locking action is held open in a targeted manner in case of a sport shifting operation.

2. The valve device according to claim 1, wherein
the valve slide element and the valve closure element are configured to interact in such a way that the valve closure element which is held in the second position is transferrable into the first position by the valve closure element being loaded by way of a force in the opening direction, which force is caused by way of a working pressure-side fluid pressure which prevails in the first valve chamber, with the result that the valve closure element is pushed in the opening direction into its first position counter to the second prestressing force by way of the first prestressing force and the force which is caused by way of the working pressure-side fluid pressure.

3. The valve device according to claim 2, wherein
the third valve chamber is connectable to a further control pressure side for loading with a further control pressure,
the valve slide element has a further fluid pressure loading section which is arranged in the third valve chamber and on which, in the case of loading with the further control pressure, a force which is directed in the opening direction acts, and
the valve slide element and the valve closure element are configured to interact in such a way that the closure element is transferrable into the first position by way of loading of the third valve chamber with the further control pressure, independently of the working pressure-side and/or actuator pressure-side fluid pressure which prevails in the first valve chamber and/or of the control fluid pressure which prevails in the second valve chamber.

4. The valve device according to claim 1, wherein the valve slide element and the valve closure element are configured to interact in such a way that the closure element is transferrable into the first position by way of loading of the third valve chamber with the further control pressure, independently of the working pressure-side and/or actuator pressure-side fluid pressure which prevails in the first valve chamber and/or of the control fluid pressure which prevails in the second valve chamber.

5. The valve device according to claim 1, wherein the vehicle is a motor vehicle or a commercial vehicle.

6. The valve device according to claim 1, wherein the first valve chamber is immediately adjacent to the second valve chamber, and the second valve chamber is immediately adjacent to the third valve chamber.

7. An automatic transmission for a vehicle, the automatic transmission having a valve device according to claim 1.

8. The automatic transmission according to claim 7, wherein the vehicle is a motor vehicle or a commercial vehicle.

9. A method for controlling a valve device for an automatic transmission for a vehicle, the valve device comprising:

a valve housing element with a first valve chamber, via which a fluid connection is establishable between a working pressure side and an actuator pressure side, and a second valve chamber which is connectable to a control pressure side for loading with a control pressure;

a valve slide element which is guided movably by way of the valve housing element and is loaded by means of a first prestressing element with a first prestressing force which is directed in an opening direction, the valve slide element having an actuating section which is arranged in the first valve chamber and a fluid pressure loading section which is arranged in the second valve chamber and on which, in the case of loading with a control pressure, a force acts which is directed in a closure direction which is opposed to the opening direction; and a valve closure element which is guided movably by way of the valve housing element in the first valve chamber in such a way that the valve closure element permits the fluid connection between the working pressure side and the actuator pressure side in a first position without operation of an oil pump, and disconnects the fluid connection in a second position, the valve closure element being loaded by means of a second prestressing element with a second prestressing force which is smaller than the first prestressing force and is directed in the closure direction, such that the valve closure element is held in the first position by means of the actuating section, the method comprising the steps of:

loading the actuator pressure side with an actuator pressure-side fluid pressure by means of a controllable working pressure-side fluid pressure;

subsequently increasing a control fluid pressure in the second valve chamber, with the result that the actuating section moves away from the valve closure element in the closure direction and the valve closure element can assume the second position; and subsequently reducing a working pressure-side fluid pressure and subsequently reducing the control pressure in the second valve chamber, with the result that the valve closure element is held in the second position by way of the second prestressing force and a force on the valve closure element, which force is caused by way of an actuator pressure-side fluid pressure which prevails in the first valve chamber, counter to the first prestressing force which is applied to the valve closure element by way of the actuating section, wherein the third valve chamber which connectable to a further control pressure side for loading with the further control pressure, the method further comprising the step of:

transferring the valve closure element into the first position by way of loading of the third valve chamber with the further control pressure, independently of the working pressure-side and actuator pressure-side fluid pressure which prevails in the first valve chamber and of the control fluid pressure into the first position, which control fluid pressure prevails in the second valve chamber, wherein the further control pressure is coupled to the system pressure via a check valve, so that a locking action is held open in a targeted manner in case of a sport shifting operation.

10. The method according to claim 9, the method further comprising the step of:

transferring of the valve closure element which is held in the second position into the first position, by the valve closure element being loaded in the opening direction with a force which is caused by way of a working pressure-side fluid pressure which prevails in the first valve chamber, with the result that the valve closure element is pushed in the opening direction into the first position by way of the first prestressing force and a force counter to the second prestressing force, which force is caused by way of the working pressure-side fluid pressure.

11. The method according to claim 10, wherein the third valve chamber is connectable to the further control pressure side for loading with a further control pressure, the method further comprising the step of:

transferring the valve closure element into the first position by way of loading of the third valve chamber with the further control pressure, independently of the working pressure-side and/or actuator pressure-side fluid pressure which prevails in the first valve chamber and/or of the control fluid pressure into the first position, which control fluid pressure prevails in the second valve chamber.

12. The method according to claim 9, wherein the vehicle is a motor vehicle or a commercial vehicle.

\* \* \* \* \*